US011156037B2

(12) United States Patent
Critsinelis et al.

(10) Patent No.: US 11,156,037 B2
(45) Date of Patent: Oct. 26, 2021

(54) SYSTEMS FOR SECURING BEND STIFFENERS TO RISER SYSTEMS IN OFFSHORE ENERGY PRODUCTION FACILITIES

(71) Applicant: Chevron U.S.A. Inc., San Ramon, CA (US)

(72) Inventors: Antonio C. F. Critsinelis, Kingwood, TX (US); Farzan Parsinejad, Houston, TX (US); Matthew Davis Hense, Houston, TX (US); Gary Anthony Giordano, Covington, LA (US)

(73) Assignee: Chevron U.S.A. Inc., San Ramon, CA (US)

( * ) Notice: Subject to any disclaimer, the term of this patent is extended or adjusted under 35 U.S.C. 154(b) by 86 days.

(21) Appl. No.: 16/445,360

(22) Filed: Jun. 19, 2019

(65) Prior Publication Data

US 2020/0399962 A1 Dec. 24, 2020

(51) Int. Cl.
| | |
|---|---|
| *E21B 17/01* | (2006.01) |
| *F16M 13/02* | (2006.01) |
| *H02G 9/02* | (2006.01) |
| *H01F 7/02* | (2006.01) |
| *H01F 1/055* | (2006.01) |

(52) U.S. Cl.
CPC ........... *E21B 17/017* (2013.01); *F16M 13/02* (2013.01); *H01F 1/055* (2013.01); *H01F 7/0263* (2013.01); *H02G 9/02* (2013.01)

(58) Field of Classification Search
CPC ...... E21B 17/017; E21B 19/004; F16L 1/126; F16L 35/00; F16L 1/20; H01B 7/045; H02G 1/10; H02G 9/02; H02G 9/12
See application file for complete search history.

(56) References Cited

U.S. PATENT DOCUMENTS

| | | | | |
|---|---|---|---|---|
| 7,387,469 | B2 * | 6/2008 | Duggan ................... | F16L 1/20 405/211 |
| 8,210,775 | B2 * | 7/2012 | Clevelario ............ | E21B 17/017 405/168.2 |
| 8,869,840 | B2 * | 10/2014 | Lund ..................... | E21B 17/017 138/110 |
| 8,955,593 | B2 * | 2/2015 | Batista De Barros ....... | E21B 43/0107 166/345 |
| 9,482,061 | B2 * | 11/2016 | Latimer ................ | E21B 19/004 |
| 9,650,842 | B2 * | 5/2017 | Carlsen ................ | E21B 17/017 |
| 10,024,482 | B2 * | 7/2018 | Whitefield .............. | F16L 57/02 |

(Continued)

*Primary Examiner* — Bradley Duckworth
(74) *Attorney, Agent, or Firm* — Jason M. Guerrero

(57) ABSTRACT

Disclosed are systems for securing a bend stiffener to a riser in an offshore energy production facility. In one system, the lower end of the bend stiffener has a magnet that repels a magnet in a clamp on the riser a distance below the bend stiffener. The magnets repel one another with a force during operation to decelerate falling and prevent contact between the clamp and the bend stiffener. Methods are provided for retrofitting a riser system by adding the magnets. In another system, the riser has an upper portion and a tapered portion immediately below the upper portion. The outer diameter of the tapered portion increases such that the tapered portion can be friction fit into the lower end of the bend stiffener in the event that the bend stiffener is forced down or free falls onto the riser.

14 Claims, 5 Drawing Sheets

(56) References Cited

U.S. PATENT DOCUMENTS

2008/0295912 A1* 12/2008 Louvain-Walters .......................... E21B 17/017
138/172
2020/0190913 A1* 6/2020 Thomsen ................ F16L 1/123

* cited by examiner

SYSTEMS FOR SECURING BEND STIFFENERS TO RISER SYSTEMS IN OFFSHORE ENERGY PRODUCTION FACILITIES

FIELD

The present disclosure relates generally to the field of riser systems used in offshore energy production facilities such as oil and gas facilities and wind farms. The present disclosure further relates to bend stiffeners used to protect such riser systems.

BACKGROUND

Offshore energy production facilities, such as offshore oil and gas production facilities and offshore wind farms, include offshore surface structures and risers connected to the surface structures. In oil and gas facilities, risers can be used for carrying production fluids from the subsea environment to the surface or for connecting power and/or control from the surface to the subsea environment. In offshore wind farms, risers can be used for providing power and/or control to the offshore structure. Conventional risers utilize bend stiffeners to protect the risers from fatigue and extreme loading riser failure. Bend stiffeners limit the extent of riser bending where the riser connects to the surface structure. The bend stiffener is usually connected to the bottom of a topside end fitting via a bend stiffener connector. The topside end fitting attaches to a pull wire to pull in the riser which is then locked in position for field life.

The bend stiffener as an integral piece of the riser system and is assembled at a factory site. If the bend stiffener fails after installation offshore, operations are required for removing and returning the riser to the factory site to replace the bend stiffener, repeat all factory testing and return the riser to the field for reinstallation and recommissioning. Thus such a failure can involve significant cost and downtime of the production facility. One of the failure mechanisms of the bend stiffener is the bend stiffener falling which may result in damage to the external sheath of the riser, potentially exposing the internal components of the riser to corroding seawater. Retrieving a fallen bend stiffener can be challenging, and the retrieved bend stiffener may not be suitable for reuse. The bottom tip of the bend stiffener may be damaged by impact with a bend stiffener stopper clamp typically located on the riser beneath the bend stiffener. The bend stiffener stopper clamp is a clamp over the riser approximately 1 to 5 m below the tip of the bend stiffener, the purpose of which is to stop the fall of a failed, disconnected bend stiffener. The stopper clamp causes local compression of the internal components of the riser which can contribute to lower fatigue life, and it would be desirable to eliminate the need for the stopper clamp if possible. In another existing design, a bend stiffener clamp surrounds the bend stiffener and is tightened with straps using diver or ROV operations. Again, it would be desirable to eliminate the need for the bend stiffener clamp if possible.

It would be desirable to eliminate the need for the bend stiffener stopper clamp and the bend stiffener clamp described above, while protecting the bend stiffener and the riser system from damage. It would further be desirable to avoid concentrated stresses on the bend stiffener and the riser.

SUMMARY

In general, in one aspect, the disclosure relates to a system for securing a bend stiffener to a riser system connected to an offshore structure in an offshore energy production facility. The system includes a bend stiffener adapted to circumferentially surround a riser for protecting an upper portion of the riser from fatigue during operation of the system. The bend stiffener has an upper end proximate an upper end of the riser and a lower end. The lower end has a first magnetic material having magnetic properties. A clamp is adapted to circumferentially surround an outer surface of the riser a distance below the bend stiffener, the clamp having an upper end having a second magnetic material having magnetic properties opposing the magnetic properties of the first magnetic material, such that the upper end of the clamp and the lower end of the bend stiffener repel one another with a repulsion force during operation of the system to decelerate falling and prevent contact between the upper end of the clamp and the lower end of the bend stiffener.

In another aspect, the disclosure can generally relate to another system for securing a bend stiffener to a riser system connected to an offshore structure in an offshore energy production facility. The system includes a bend stiffener adapted to circumferentially surround the riser and a circumferential gap around the riser, the bend stiffener having an upper end and a lower end. The system also includes the riser having an upper end having a first outer diameter less than an inner diameter of the lower end of the bend stiffener. The riser has an upper portion having a first outer diameter and an upper portion length, and a tapered portion immediately below the upper portion having a tapered portion length wherein the tapered portion has an outer diameter that gradually increases from the first outer diameter to a second outer diameter, such that the tapered portion can be friction fit into the lower end of the bend stiffener in the event that the bend stiffener is forced down or free falls onto the riser.

In yet another aspect, the disclosure can generally relate to a method for retrofitting a riser system connected to an offshore structure in an offshore energy production facility. The method includes adding a first material having magnetic properties into a lower end of an existing installed bend stiffener circumferentially surrounding a riser for protecting an upper portion of the riser from fatigue during operation of the system, and adding a second material having magnetic properties opposing the magnetic properties of the first material into an upper end of an existing installed clamp circumferentially surrounding the riser a distance below the bend stiffener. The upper end of the clamp and the lower end of the bend stiffener repel one another with a repulsion force during operation of the system to prevent contact between the upper end of the clamp and the lower end of the bend stiffener.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
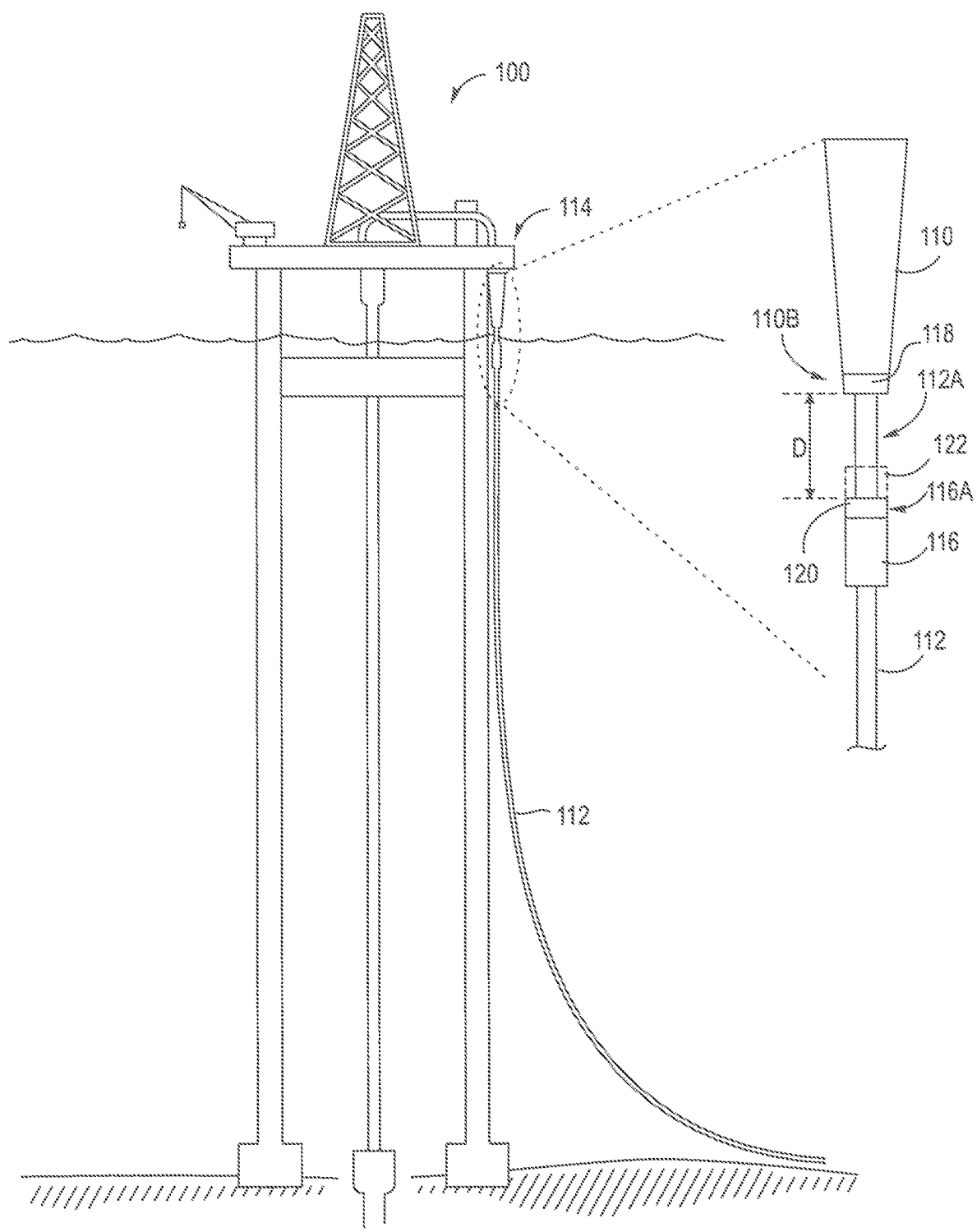
FIG. 1 shows a simplified schematic diagram of a field system in which embodiments can be applied and one embodiment.

In one embodiment, referring to FIG. 1, a system is provided for securing a bend stiffener 110 to a riser 112 connected to an offshore structure 114 in an offshore energy production facility 100. The offshore energy production facility 100 can be an oil and gas production facility or an offshore wind farm. The riser 112 can contain there within a conduit for fluids and/or at least one power cable or control cable (not shown).

The bend stiffener 110 circumferentially surrounds the riser 112 so that it protects an upper portion of the riser 112 from fatigue during operation of the riser. The bend stiffener 110 includes a magnetic material, also referred to as a magnet 118, in a lower end 110B proximate an upper end 112A of the riser 112. A clamp 116 circumferentially surrounds an outer surface of the riser 112 a distance D below the bend stiffener 110. The clamp 116 includes another magnetic material, also referred to as a magnet 120, in an upper end 116A of the clamp 116. The clamp 116 with magnet 120 can be preinstalled on the riser 112 before delivery to the offshore facility location. The magnet 120 has magnetic properties opposing the magnetic properties of the magnet 118 such that the upper end of the clamp 116A and the lower end of the bend stiffener 110B repel one another with a repulsion force during operation of the system 100 to decelerate potential falling of the bend stiffener 110 and to prevent contact between the upper end of the clamp 116A and the lower end of the bend stiffener 110B.

The magnetic material used in the upper end of the clamp 116A and that used in the lower end of the bend stiffener 110B can be any magnets suitable for use in a subsea environment. In one embodiment, the magnetic material used in the upper end of the clamp 116A and the lower end of the bend stiffener 110B is a samarium-cobalt (SmCo) magnet, e.g. a $SmCo_5$ magnet or a $Sm_2Co_{17}$ magnet, having sufficient strength to meet the particular design requirements. Nonlimiting examples of such magnets include SmCo magnets available from Apex Magnets (Petersburg, W. Va.) and from Magnetic Hold, Inc. (Goodlettsville, Tenn.).

In one embodiment, the magnet 118 is in the form of a cylinder integrally connected with the bottom end 110B of the bend stiffener, also referred to as the tip of the bend stiffener 110. In one embodiment, the magnet 118 can be connected to the bend stiffener 110 using bolts (not shown) passing through bolt holes (not shown) in the magnet 118 and into corresponding bolt holes (not shown) in the bottom end 110B of the bend stiffener 110.

Figure 2:
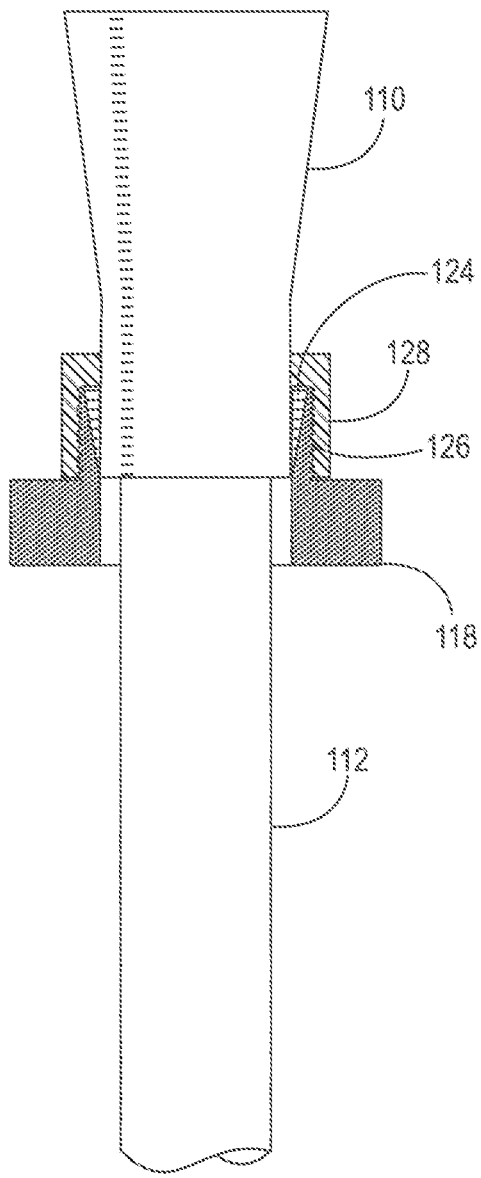
FIG. 2 shows one embodiment of an attachment means for use in the embodiment shown in FIG. 1.

Alternatively, the magnet 118 can be connected to the bend stiffener 110 through the use of a locking profile, as shown in FIG. 2. In this embodiment, a cylindrical wedge component 124 formed of a steel alloy suitable to resist corrosion is fit around the tip of the bend stiffener 110. In one embodiment, the magnet 118 is welded to a threaded connector 126. In one embodiment, the magnet 118 is bolted to the threaded connector 126. The threaded connector 126 and threaded nut 128 each have threads to make the connection between the two pieces. Surrounding the magnet and wedge component 124 is a threaded nut 128 to apply mechanical pressure to the magnet and wedge component 124, with the necessary coatings for corrosion protection. In one embodiment, the magnet 118 can be made to have the shape of the magnet with the threaded connector integrated therein to fit around the wedge component 124 as shown. In this case, the magnet 118 has threads to connect with the threaded nut 128.

In one embodiment, the magnet 120 is in the form of a cylinder, and has an inner diameter greater than the outer diameter of the riser 112 to permit sufficient clearance for installation around the riser 112. The distance between the inner diameter and the outer diameter of the magnet 120 can be any suitable dimension, e.g., from 1 to 10 inches.

Advantageously, when the clamp 116 is installed and tightened around the outer surface of the riser 112, friction between an inner surface of the clamp 116 and the outer surface of the riser 112 enables the clamp 116 to support an impact load of up to 5 tons. In other words, the clamp 116 will withstand the force of an object impacting the clamp 116 at a load of up to 5 tons without being displaced.

In one embodiment, returning to FIG. 1, a shielding layer 122 is used between the lower end of the bend stiffener 110B and the upper end of the clamp 116A to block or eliminate the repulsion force between the magnets 118 and 120 prior to and during assembly of the bend stiffener 110 and the clamp 116. The shielding layer 122 can be a cylindrical insert made from any suitable shielding material. In one embodiment, the shielding material is a ferrite material. The shielding layer 122 can be removed to establish the repulsion forces between the magnets 118 and 120 during installation and/or operation of the system 100. The shielding layer 122 can have any suitable dimensions, e.g., a thickness of from 1 to 10 inches. In one embodiment, the shielding layer 122 could be built into a ring clamp over the magnetic clamp with two half shells that can be bolted together before installation and removed after installation.

The system 100 avoids the need for the installation of a large bend stiffener stopper clamp on the riser as described in the Background herein. The bend stiffener 110 is less likely to fall on the clamp 116, and if it does fall, damage to the bend stiffener 110 can be minimized due to the deceleration resulting from the repulsion force between magnets 118 and 120.

In one embodiment, an existing riser system connected to an offshore structure 114 in an offshore energy production facility is retrofitted by adding the magnet 118 into the lower end 110B of an existing installed bend stiffener 110 circumferentially surrounding riser 112, and adding the magnet 120 having magnetic properties opposing the magnetic properties of magnet 118 into the upper end 116A of an existing installed clamp 116 circumferentially surrounding the riser 112 a distance below the bend stiffener 110, such that the upper end of the clamp 116A and the lower end of the bend stiffener 110B repel one another with a repulsion force during operation of the riser system. As described above, a removeable shielding layer 122 can be placed between the upper end of the clamp 116 and the lower end of the bend stiffener 110B prior to the addition of the magnets 118 and 120 to aid in installation. The removeable shielding layer 122 can be removed after installation.

Figure 3:
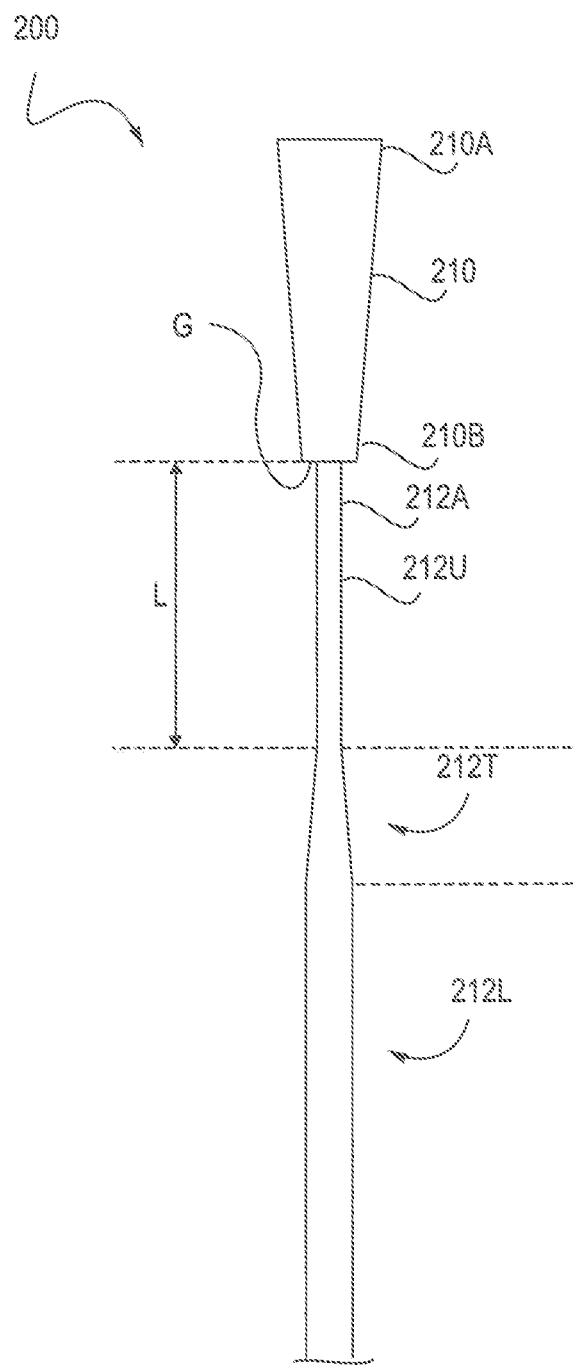
FIG. 3 shows a simplified alternative embodiment.

In another embodiment, referring to FIG. 3, a system 200 is provided for securing a bend stiffener 210 to a riser 212 connected to an offshore structure in an offshore energy production facility. The bend stiffener 210 circumferentially surrounds the riser 212 as well as a circumferential gap G around the riser 212. The bend stiffener has an upper end 210A and a lower end 210B which has a lower end inner diameter $210B_{ID}$. The riser 212 has an upper end 212A that has an outer diameter $212A_{OD}$ that is less than the lower end inner diameter $210B_{ID}$ of the lower end of the bend stiffener 210. The riser 212 has an upper portion 212U having an outer diameter and a length, and a tapered portion 212T immediately below the upper portion 212U. The tapered portion 212T has an outer diameter that gradually increases from the outer diameter at the upper end 212A to a second outer diameter. The second outer diameter can be, for example, from 10 to 15 mm greater than the outer diameter $212A_{OD}$ of the upper end 212A. The tapered portion 212T can be friction fit into the lower end of the bend stiffener 210B in the event that the bend stiffener 210 is forced down or free falls onto the riser 212.

Figure 4:
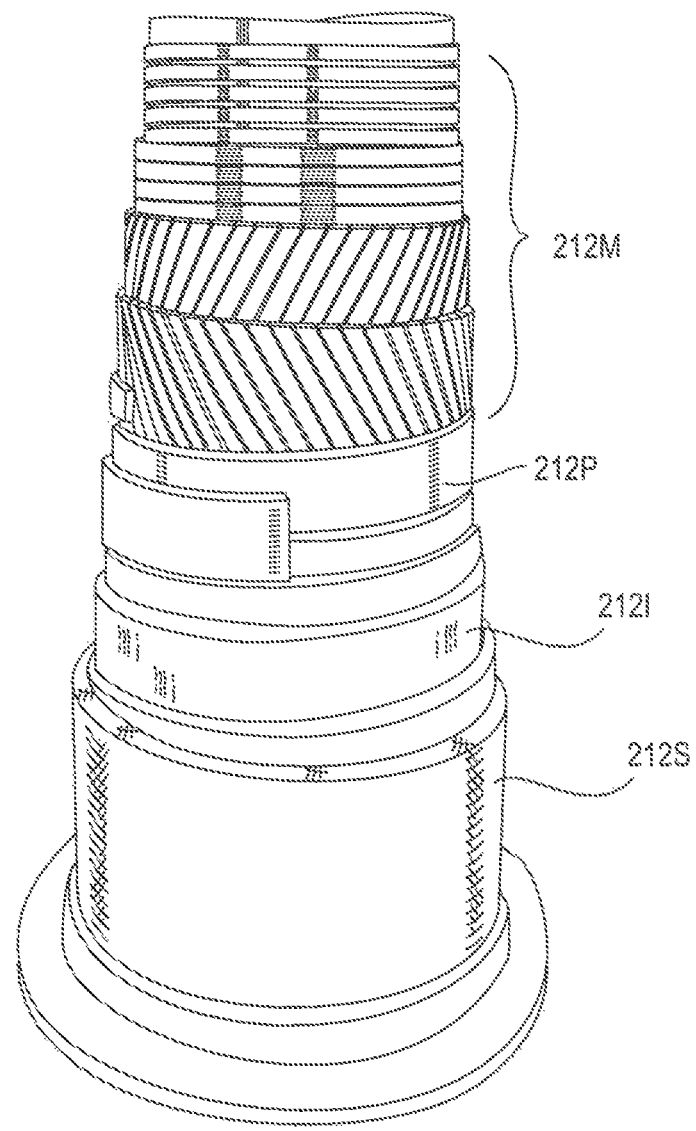
FIG. 4 shows a multilayer flexible pipe riser for use in one embodiment.

In one embodiment, referring to FIG. 4, the riser 212 can be a multilayer flexible pipe riser having multiple layers including an outer protective sheath layer 212S, at least one insulation layer 212I, an intermediate plastic layer 212P, and metal elements 212M surrounded by the intermediate plastic layer 212P. In one embodiment, the upper portion 212U can include all of the multiple layers with the exception of the outer protective sheath layer 212S and at least one insulation layer 212I, and the tapered portion 212T can include all of the multiple layers (outer protective sheath layer 212S, insulation layer(s) 212I, intermediate plastic layer 212P, and metal elements 212M). The riser 212 can further extend downward to include a lower portion 212L immediately below the tapered portion 212T having the second outer diameter.

The tapered portion of the riser 212T can be formed by any suitable means. In one embodiment, the tapered portion 212T is formed by extruding an outer layer of polymer onto the riser 212 utilizing a known extrusion method. The gradually increasing outer diameter of the tapered portion can be formed by machining the extruded outer layer to achieve the desired tapered profile. Alternatively, the tapered portion 212T can be formed by gluing the outer layer onto the riser 212. Alternatively, the tapered portion 212T can be formed by clamping the outer layer onto the riser 212. Alternatively, the tapered portion 212T can be formed by wrapping a tape layer around the riser 212.

In some embodiments, the system 200 provides for reduced impact on the local stiffness and dynamic behavior of the riser 212, and damage to the bend stiffener 210 or the riser 212 in case the bend stiffener becomes disconnected and falls onto the tapered portion of the riser. Installation time can be reduced as compared with current practice. Additionally, the riser 212 includes an extra layer of protection against flooding of the annulus of the riser 212 in the event of a breach of the external sheath of the riser 212, thus providing additional protection for the internal elements of the riser 212 against corrosion and the like caused by the ingress of seawater.

Figure 5:
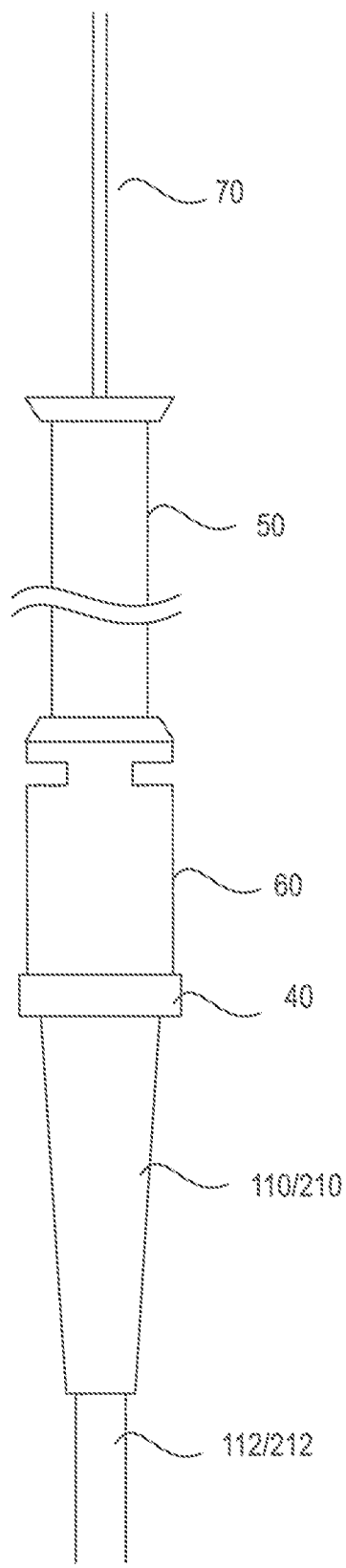
FIG. 5 shows additional components attached to either the embodiment shown in FIG. 1 or FIG. 3.

Each of the systems shown in FIG. 1 and FIG. 3 can also include additional components. As shown in FIG. 5, a bend stiffener connector 40 is attached to the upper end of the bend stiffener, the bend stiffener connector 40 having a mechanism for mating to a facility hang off interface 50. The facility hang off interface 50 is also commonly referred to as a pull-tube, a J-tube or an I-tube. A topside end fitting 60 attaches to the bend stiffener connector 40 for attaching to a pull wire 70 and for releasing the riser once the bend stiffener is connected to the facility hang off interface 50.

As described above, the system 200 involves the use of a riser 212 having the tapered portion 212T having a gradually increasing outer diameter. The tapered portion 212T is a first predetermined distance L from the upper end of the riser 212. In some embodiments, L can be from about 1 m to about 200 m. The taper 212T can begin about 1-5 m below the bend stiffener 210. This system 200 can simplify and reduce the cost of the installation of the bend stiffener 210. For instance, in a method for installing the bend stiffener 210, a topside end fitting 60 attached to the bend stiffener connector assembly 40 is pulled with a pull wire 70 with sufficient force to engage the latching mechanism of the bend stiffener connector 40 to the facility hang off interface 50 structure as is known to those of ordinary skill in the art. The facility hang off interface 50 is attached to a floating structure and has an upper end above a deck of the floating structure and a lower end submerged in the water. Upon latching of the bend stiffener connector 40 automatically to the facility hang off interface 50, the topside end fitting 60 connection is released and pulled a pre-determined distance to the deck level of the surface structure for hang-off to complete the installation. The topside end fitting 60 is removed from the riser 212. Thus the tapered portion of the riser 212 is installed just below the bend stiffener 210. Using the system 200, no additional offshore stopper clamp installation is required. This can reduce or eliminate the need for divers or remotely operated vehicle (ROV) operations.

In another embodiment, a system includes a bend stiffener circumferentially surrounding a riser and a circumferential gap around the riser, the bend stiffener having an upper end and a lower end. The riser has an upper end having a first outer diameter less than an inner diameter of the lower end of the bend stiffener. The riser has an upper portion with a first outer diameter and an upper portion length, and a swellable portion immediately below the upper portion. The swellable portion has an outer diameter that increases from the first outer diameter to a second outer diameter over a distance from the upper portion and over time after the swellable portion is placed in contact with water. Over the time period, the swellable portion can be friction fit into the lower end of the bend stiffener in the event that the bend stiffener is forced onto the riser. The swellable portion contains a swellable gel material as well as a material such as an epoxy to delay the timing of the swelling. The swellable portion can take the form of a wrap layer surrounding the riser. The swellable portion can be extruded onto the riser.

In another embodiment, corrosion of the bolts used to attach the bend stiffener to the bend stiffener connector is reduced by replacing standard ASTM A193 B7 bolt material with bolts made from a corrosion resistant material such as Inconel austenitic nickel-chromium-based superalloys. By reducing corrosion of these bolts, the incidence of falling bend stiffeners can be reduced.

Advantageously, the systems disclosed herein can result in reduced corrosion of elements within the riser (112 or 212), easier and quicker installation, and reduced damage to the bend stiffener (110 or 210).

It should be noted that only the components relevant to the disclosure are shown in the figures, and that many other components normally part of a riser system are not shown for simplicity.

For the purposes of this specification and appended claims, unless otherwise indicated, all numbers expressing quantities, percentages or proportions, and other numerical values used in the specification and claims are to be understood as being modified in all instances by the term "about."

Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for securing a bend stiffener to a riser system connected to an offshore structure in an offshore energy production facility, the system comprising:
    a. a bend stiffener adapted to circumferentially surround a riser for protecting an upper portion of the riser from fatigue during operation of the system, the bend stiffener having a lower end proximate an upper end of the riser, the lower end comprising a first magnetic material having magnetic properties; and
    b. a clamp adapted to circumferentially surround an outer surface of the riser a distance below the bend stiffener, the clamp having an upper end comprising a second magnetic material having magnetic properties opposing the magnetic properties of the first magnetic material such that the upper end of the clamp and the lower end of the bend stiffener repel one another with a repulsion force during operation of the system to decelerate falling and prevent contact between the upper end of the clamp and the lower end of the bend stiffener.

2. The system of claim 1 wherein the first magnetic material and the second magnetic material comprise a samarium-cobalt magnet.

3. The system of claim 1 wherein the first magnetic material and the second magnetic material are in the form of a first cylindrical component attachable to a tip of the bend stiffener and a second cylindrical component, respectively, wherein the second cylindrical component has an inner diameter and an outer diameter, and the inner diameter of the second cylindrical component is greater than an outer diameter of the riser to permit sufficient clearance for installation around the riser, and a distance between the inner diameter and the outer diameter of the second cylindrical component is from 1 to 10 inches.

4. The system of claim 3 wherein the first cylindrical component comprises bolt holes there through so that the first cylindrical component is attachable to the tip of the bend stiffener using bolts.

5. The system of claim 3 further comprising a cylindrical wedge component for fitting around the tip of the bend stiffener, a threaded connector for fitting around the cylindrical wedge component and a threaded nut for fitting around the threaded connector, wherein the first cylindrical component is attachable to the threaded connector using bolts or welding, such that when installed the threaded nut applies mechanical pressure to the threaded connector and the cylindrical wedge component, thereby attaching the first cylindrical component to the tip of the bend stiffener.

6. The system of claim 3 wherein, when the clamp is installed and tightened around the outer surface of the riser, friction between an inner surface of the clamp and the outer surface of the riser enables the clamp to support an impact load of up to 5 tons.

7. The system of claim 1 further comprising a removeable shielding layer for eliminating the repulsion force between the upper end of the clamp and the lower end of the bend stiffener prior to and during assembly of the bend stiffener and the clamp, wherein the shielding layer can be removed for establishing the repulsion forces during installation and/or operation of the system.

8. The system of claim 7 wherein the removeable shielding layer is a cylindrical insert comprising a ferrite compound material comprising iron.

9. The system of claim 8 wherein the removeable shielding layer has a thickness of from 1 to 10 inches.

10. The system of claim 1, further comprising a bend stiffener connector attached to the upper end of the bend stiffener wherein the bend stiffener connector is configured to attach to a facility hang off interface; and a topside end fitting attached to the bend stiffener connector for attaching to a pull wire and for releasing the riser once the bend stiffener is connected to the facility hang off interface.

11. The system of claim 1 wherein the offshore energy production facility is a subsea oil and gas and energy production or an offshore wind farm.

12. The system of claim 1 wherein the riser contains a conduit for fluid or a power cable.

13. A method for retrofitting a riser system connected to an offshore structure in an offshore energy production facility, the method comprising:
    a. adding a first material having magnetic properties into a lower end of an existing installed bend stiffener circumferentially surrounding a riser for protecting an upper portion of the riser from fatigue during operation of the system; and
    b. adding a second material having magnetic properties opposing the magnetic properties of the first material into an upper end of an existing installed clamp circumferentially surrounding the riser a distance below the bend stiffener, such that the upper end of the clamp and the lower end of the bend stiffener repel one another with a repulsion force during operation of the system to prevent contact between the upper end of the clamp and the lower end of the bend stiffener.

14. The method of claim 13 further comprising placing a removeable shielding layer for eliminating the repulsion force between the upper end of the clamp and the lower end of the bend stiffener prior to the addition of the first material and the second material, and removing the removeable shielding layer after the addition of the first material and the second material.

* * * * *